US011718919B2

(12) United States Patent
Jaramillo et al.

(10) Patent No.: US 11,718,919 B2
(45) Date of Patent: Aug. 8, 2023

(54) ELECTROCHEMICAL HYDROGEN PEROXIDE GENERATING DEVICE (71) Applicant: The Board of Trustees of the Leland Stanford Junior University, Stanford, CA (US)

(72) Inventors: Thomas Francisco Jaramillo, Menlo Park, CA (US); Zhenan Bao, Stanford, CA (US); Jens K. Nørskov, Copenhagen (DK); Shucheng Chen, Stanford, CA (US); Zhihua Chen, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 412 days.

(21) Appl. No.: 16/342,656

(22) PCT Filed: Oct. 17, 2017

(86) PCT No.: PCT/US2017/056924
§ 371 (c)(1),
(2) Date: Apr. 17, 2019

(87) PCT Pub. No.: WO2018/075483
PCT Pub. Date: Apr. 26, 2018

(65) Prior Publication Data
US 2021/0285114 A1    Sep. 16, 2021

Related U.S. Application Data (60) Provisional application No. 62/409,231, filed on Oct. 17, 2016.

(51) Int. Cl.
C25B 9/00    (2021.01)
C25B 1/30    (2006.01)
(Continued)

(52) U.S. Cl.
CPC .............. *C25B 1/30* (2013.01); *C02F 1/722* (2013.01); *C25B 9/17* (2021.01); *C25B 11/032* (2021.01);
(Continued)

(58) Field of Classification Search
CPC ... C25B 1/30; C25B 9/17; C25B 11/032; C25B 11/065; C25B 15/08; H01M 4/8605; H01M 4/96
See application file for complete search history.

(56) References Cited

U.S. PATENT DOCUMENTS 2,000,815 A    5/1935  Ernst
3,607,687 A *  9/1971  Grangaard ............... C25B 1/30
                                                            205/465

(Continued)

FOREIGN PATENT DOCUMENTS

EP    2468398    6/2012

OTHER PUBLICATIONS

Tomantschger et al. Development of Low Cost Alkaline Fuel Cells. Journal of Power Sources. 18 (1986) 317-335. (Year: 1986).*
(Continued)

*Primary Examiner* — Zulmariam Mendez
(74) *Attorney, Agent, or Firm* — Lumen Patent Firm (57) ABSTRACT

A membrane-free electrochemical reactor and fuel-cell having a collection chamber between a first and second chamber, a mesoporous carbon paper cathode between the first chamber and the collection chamber, a mesoporous carbon paper anode between the second chamber and the collection chamber, the cathode is coated with an oxygen reduction reaction catalyst that imparts a two-electron partial reduction reaction to hydrogen peroxide, the anode is coated with an oxygen evolution reaction coating or a hydrogen oxidation reaction coating, oxygen/air input and output ports con-
(Continued)

nected to the first chamber, KOH/water input and output ports connected to the second chamber that are in an open state under an electrolyzer mode, $H_2$/water input and output ports connected to the second chamber that are in an open state under a fuel-cell mode, a second KOH/water input port connected to the collection chamber, and a hydrogen peroxide/KOH/water output port connected to the collection chamber.

4 Claims, 5 Drawing Sheets

(51) Int. Cl.

| | | |
|---|---|---|
| C25B 11/032 | (2021.01) | |
| C25B 11/052 | (2021.01) | |
| C25B 11/065 | (2021.01) | |
| C25B 9/17 | (2021.01) | |
| C02F 1/72 | (2023.01) | |
| C25B 15/08 | (2006.01) | |
| H01M 4/86 | (2006.01) | |
| H01M 4/96 | (2006.01) | |
| C02F 103/28 | (2006.01) | |

(52) U.S. Cl.
CPC .......... *C25B 11/052* (2021.01); *C25B 11/065* (2021.01); *C25B 15/08* (2013.01); *H01M 4/8605* (2013.01); *H01M 4/96* (2013.01); *C02F 2103/28* (2013.01); *C02F 2201/008* (2013.01); *C02F 2303/04* (2013.01)

(56) References Cited

U.S. PATENT DOCUMENTS

| | | | |
|---|---|---|---|
| 5,647,968 | A | 7/1997 | Fraser |
| 5,885,729 | A * | 3/1999 | Marchetti ........... H01M 8/0245 |
| | | | 429/522 |
| 6,685,818 | B2 | 2/2004 | Lehmann |
| 6,712,949 | B2 | 3/2004 | Gopal |
| 7,604,719 | B2 | 10/2009 | Vanden Bussche |
| 11,050,076 | B1 * | 6/2021 | Wang ..................... C25B 15/08 |
| 2003/0019758 | A1 | 1/2003 | Gopal |
| 2007/0270305 | A1 * | 11/2007 | Pak ........................ H01M 4/885 |
| | | | 502/172 |
| 2012/0048744 | A1 | 3/2012 | Kim |
| 2016/0068973 | A1 * | 3/2016 | Stephens .................. C25B 1/30 |
| | | | 429/487 |
| 2017/0098843 | A1 * | 4/2017 | Manthiram ........... H01M 4/921 |

OTHER PUBLICATIONS

Gillespie et al "Performance Evaluation of a membraneless divergent electrode-flow (DEFT) alkaline electrolyser based on optimisation of electrolytic flow and electrode gap" J. Power Sources 293, 2015 228-235.

Chen et al. "Development of a reactor with carbon catalyst for modular-scale low-cost electrochemical generation of H2O2" React. Chem. Eng. 2017, 2, 239-245.

Yamanaka et al. "Direct and Continuous Production of Hydrogen Peroxide with 93% Selectivity Using a Fuel-Cell System" Angew. Chem. Int. Ed. 2003, 42 3653-3655.

Tomantschger et al. "Devleopment of low cost alkaline fuel cells" J. Power Sources, 18, 1986 317-335.

* cited by examiner

Carbon synthesis

FIG. 4

|  | Electrolyzer 1 | Electrolyzer 2 | Electrolyzer 3 (120min Stability) |
|---|---|---|---|
| Cathode | 0.0848mg/cm$^2$ CMK-3 + Oxygen | 0.0848mg/cm$^2$ CMK-3 + Oxygen | 0.0848mg/cm$^2$ CMK-3 + Oxygen |
| Anode | 0.2544mg/cm$^2$ Pt + H$_2$O | 0.4240mg/cm$^2$ N-C+ H$_2$O | 0.007mg/cm$^2$ Ni$_{0.75}$Fe$_{0.25}$O$_x$ +H$_2$O |
| Product/Efficiency | 518 mg/L (~0.05 wt.%) Faradaic efficiency 100% | 425 mg/L (~0.04 wt.%) Faradaic efficiency 100% | 2795mg/L ~0.3 wt. % |

FIG. 5

ELECTROCHEMICAL HYDROGEN PEROXIDE GENERATING DEVICE

CROSS-REFERENCE TO RELATED APPLICATIONS

This application is a 371 of PCT application PCT/US2017/056924 filed Oct. 17, 2017. PCT application PCT/US2017/056924 claims the benefit of U.S. Provisional application 62/409,231 filed Oct. 17, 2016.

FIELD OF THE INVENTION

The current invention relates generally to hydrogen peroxide production. More specifically, the invention relates to a membrane-free reactor for continuous, small-scale, and decentralized production of $H_2O_2$.

BACKGROUND OF THE INVENTION

Limited access to clean water is one of the major issues for billions of people in developing world. According to a recent UN Global issue report, millions of people lack access to drinking water just in the Sub-Saharan Africa. The problem is often not access to water itself, but its contamination with urban, industrial, and agricultural waste. Conventionally, chlorine has been widely used for disinfection and oxidation for drinking water treatment.

It is added to water as chlorine gas, sodium hypochlorite solution, or dry calcium hypochlorite to eliminate pathogenic organisms and remove any color, taste, and odor compounds. Unfortunately, excess chlorine residues and byproducts of treatment can have negative effects, including eye irritation, and harm to the growth and reproduction of aquatic life, even at low concentrations.

Hydrogen peroxide ($H_2O_2$) is an attractive alternative for water treatment. It is a stronger oxidizing agent capable of removing disease-causing organisms as well as persistent organic pollutants. Importantly, its intrinsic decomposition route results in the production of harmless byproducts, water and oxygen. Despite these favorable properties, low-cost, decentralized $H_2O_2$ production is a challenge as industrial production is performed through an anthraquinone oxidation process that requires multiple energy-intensive reaction steps, and is not conducive to small-scale operation. In addition, the instability of $H_2O_2$ poses a safety issue for transportation, which further hinders the use of $H_2O_2$ for water treatment in developing countries. The cost and safety issues of $H_2O_2$ make this potentially important chemical largely inaccessible to the large number of people who need it the most.

One promising method to produce $H_2O_2$ on-site is by electrochemical advanced oxidation processes (EAOPs). These processes have been recently developed for water purification, where hydrogen peroxide is generated on-site from a two-electron reduction of injected $O_2$ where it can be immediately used as an oxidizing agent for water treatment. More importantly, an EAOP device can be coupled with intermittent power sources such as wind and solar, and thus can be used even in remote regions that lack access to conventional energy for process heat and electricity. However, EAOP devices often exhibit low efficiency due to the lack of active and selective catalysts, and sub-optimal cell designs in which key components can degrade from the active radicals generated from $H_2O_2$.

One of the major challenges for two-electron $O_2$ reduction to $H_2O_2$ is the competing four-electron $O_2$ reduction pathway to water. Recent understanding indicates that catalysts capable of preserving the O—O bond during electrochemical $O_2$ reduction are selective for $H_2O_2$ over water. Some of promising examples are Pd and Pt alloyed with mercury and PdAu alloys. While some of these alloys have been shown to be active, selective and stable for two-electron $O_2$ reduction, mercury is toxic and precious metals such as Pd, Pt, and Au limit their implementation into EAPO devices. As a result, there is a need to develop improved EAOP devices and catalysts for efficient, stable, scalable, and decentralized $O_2$ production; ideally that can operate in either a fuel cell mode or an electrolyzer mode.

SUMMARY OF THE INVENTION

To address the needs in the art, a membrane-free electrochemical reactor and fuel-cell is provided, that includes a collection chamber disposed between a first chamber and a second chamber, where the first chamber and the second chamber are sealably connected to the collection chamber, a mesoporous carbon paper cathode, and a mesoporous carbon paper anode, where the mesoporous carbon paper cathode is disposed between the first chamber and the collection chamber, where the mesoporous carbon paper anode is disposed between the second chamber and the collection chamber, where the mesoporous carbon paper cathode is coated with an Oxygen Reduction Reaction (ORR) catalyst, where the ORR catalyst imparts a two-electron partial reduction reaction to hydrogen peroxide, where the mesoporous carbon paper anode is coated with an Oxygen Evolution Reaction (OER) coating or a Hydrogen Oxidation Reaction (HOR) coating, an oxygen/air input port, and an oxygen/air output port, where the oxygen/air input port is connected to the first chamber, where the oxygen/air output port is connected to the first chamber, a KOH/water input port, and a KOH/water output port, where the KOH/water input port is connected to the collection chamber, where the KOH/water output port is connected to the second chamber, where the KOH/water input port and the KOH/water output port are in an open state under an electrolyzer operation mode, a $H_2$/water input port, and a $H_2$/water output port, where the $H_2$/water input port is connected to the second chamber, where the $H_2$/water output port is connected to the second chamber, where the $H_2$/water input port and the $H_2$/water output port are in an open state under a fuel-cell operation mode, a second KOH/water input port connected to the collection chamber, and a hydrogen peroxide/KOH/water output port connected to the collection chamber.

According to one embodiment of the invention, the anode is coated with a catalyst that includes an active Oxygen Evolution Reaction (OER) material that is stable during to operation of the electrochemical reactor. Here, the OER material faces the second chamber.

In another aspect of the invention, one side of the anode is coated with a hydrophobic polymer, or where the anode is in an uncoated state.

In a further aspect of the invention, one side of the cathode is coated the ORR catalyst. Here, the ORR coating faces the collection chamber.

According to one aspect of the invention, the cathode is coated with a conductive layer that includes a high surface area catalyst a support material, or a catalyst and a support material, including carbon-based systems.

DETAILED DESCRIPTION

The development of small-scale, decentralized reactors for $H_2O_2$ production that can couple to renewable energy sources would be of great benefit, particularly for water purification in the developing world. Herein we describe our efforts to develop electrochemical reactors for $H_2O_2$ generation with high Faradaic efficiencies >90%, requiring cell voltages of only ~1.6 V. The reactor employs a carbon-based catalyst that demonstrates excellent performance for $H_2O_2$ production in alkaline conditions, as demonstrated with fundamental studies involving rotating-ring disk electrode (RRDE) methods. The low-cost, membrane-free reactor design represents a step towards the continuous, small-scale, and decentralized production of $H_2O_2$.

Porous carbon-based materials are promising candidates for generating $H_2O_2$ through the two-electron $O_2$ reduction reaction (ORR). These materials are inexpensive, nontoxic, stable, and active for $H_2O_2$ production, making them suitable for practical applications. The current invention utilized an exceptionally active and selective catalyst, CMK-3 (ACS Materials), made of highly defective carbon with ordered mesoporous structures. The current invention shows the stability of the CMK-3 catalyst for the electrochemical reduction of $O_2$ to $H_2O_2$. These properties make CMK-3 an excellent candidate to be incorporated into a device for $H_2O_2$ production. To achieve a low-cost device, all of the materials in the device are readily available and manufacturable with low-cost methods. Demonstrated herein is a low-cost device design using polycarbonate cell body, a carbon catalyst, and alkaline electrolyte. The device shows high efficiency and stability under operation due to the exceptional electrocatalytic properties of the carbon-based catalyst and the membrane-less configuration.

According to one embodiment, with the idea that pore-size and the types and concentrations of defects (e.g. $sp^2$-type defects) affect the overall performance of $H_2O_2$ production catalysts, a mesoporous carbon, CMK-3 is used. This material is an ordered mesoporous carbon with hierarchical pores, synthesized using SBA-15 silica as the template, sucrose as the carbon source, and sulfuric acid as the carbonization catalyst.

Rotating ring disk electrode (RRDE) measurements using a four-electrode configuration are used to investigate catalyst performance. Voltammograms were made at 1600 rpm in $O_2$-saturated electrolyte with the ring current density adjusted for the measured collection efficiency. The disk current shows that CMK-3 reaches a mass transport-limited current at ~0.65 V vs RHE, demonstrating high ORR activity for CMK-3. The ring current tracks with the disk current, demonstrating that CMK-3 is also selective for two-electron ORR to $H_2O_2$. Using the ring and disk currents, a high selectivity of over 90% for $H_2O_2$ is confirmed. Koutecky-Levich analysis was performed by controlling the electrode rotation rates to further examine the selectivity of CMK-3 for the two-electron ORR. The calculated number of electrons transferred per $O_2$ molecule was approximately 2, consistent with the high selectivity for two-electron ORR observed in RRDE measurements. As revealed by both techniques, CMK-3 has a high selectivity towards the two-electron ORR pathway across a wide range of applied potentials.

Apart from the activity and selectivity, the stability is another key catalyst performance metric, particularly in the presence of $H_2O_2$, which is a highly oxidizing agent. An accelerated durability test was conducted by sweeping the potential between 0.2 and 1.1 V vs. RHE at a scan rate of 200 mV/s for 1,000 cycles. In $1^{st}$, $200^{th}$, $500^{th}$, and $1000^{th}$ cyclic voltammograms, each measured at a scan rate of 10 mV/s, CMK-3 showed excellent stability over 1000 cycles with negligible decay in current, indicating an intrinsic stability of defect sites to oxidation from the highly active radicals created by the self-disproportionation of $H_2O_2$. Overall, these electrochemical measurements demonstrate that CMK-3 is a high-performance two-electron ORR catalyst with fast kinetics, a high selectivity for $H_2O_2$, and promising long-term stability.

According to the current study, for $H_2O_2$ production three design criteria are listed as follows:

1. The decomposition of $H_2O_2$ product must be minimized. As $H_2O_2$ can be readily decomposed by transition metals and reductive organic compounds, the main body of the device must be composed of an inert plastic of a relatively simple design that will also help reduce manufacturing costs.
2. The device must be operated at sufficiently high current densities and low applied cell potentials to achieve a large production rates with high current efficiency. Thus, in addition to the proper $H_2O_2$ production catalyst at the cathode, the anode must also be highly active for oxidation reaction and stable during operation.
3. The device must be stable and product crossover should be minimized to prevent oxidation of $H_2O_2$ on the anode. In previously reported designs, membranes have been used for product separation but might also be a limiting factor for stability. A membrane-free system that can also prevent product crossover is essential for cell durability. Moreover, membrane removal may further reduce the applied potential by lowering the overall ohmic loss.

Figure 1A:
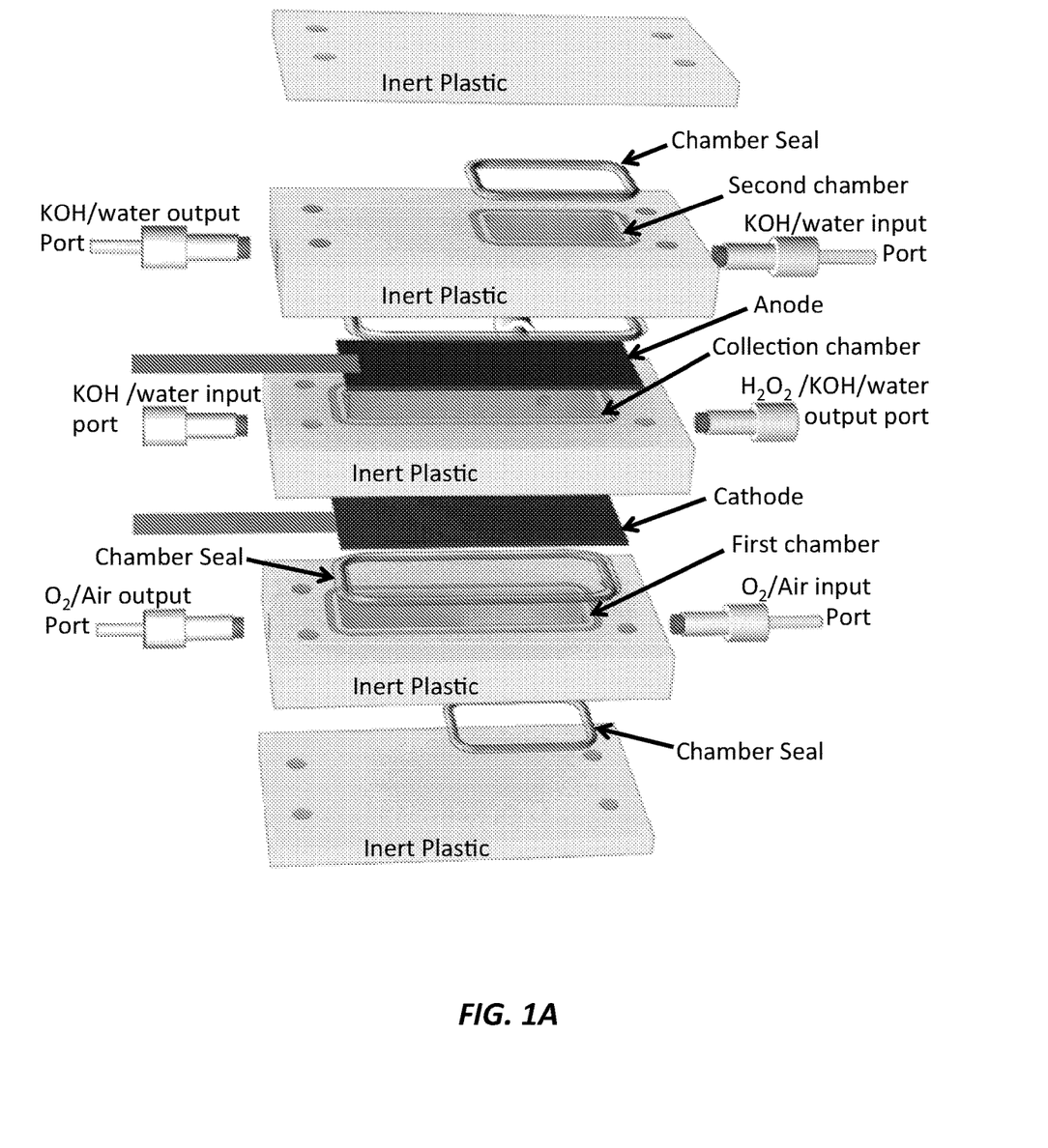
FIGS. 1A-1C show (IA) a membrane-free electrolyzer and fuel-cell having three main chambers: the cathode (first chamber, working electrode), the product storage collection (collection chamber), and the anode (second chamber, counter electrode) compartments, (1B) the membrane-free electrolyzer and fuel-cell configured for the electrolyzer mode, (1C) the membrane-free electrolyzer and fuel-cell configured for the fuel-cell mode, according to embodiments of the invention.
Figure 1B:
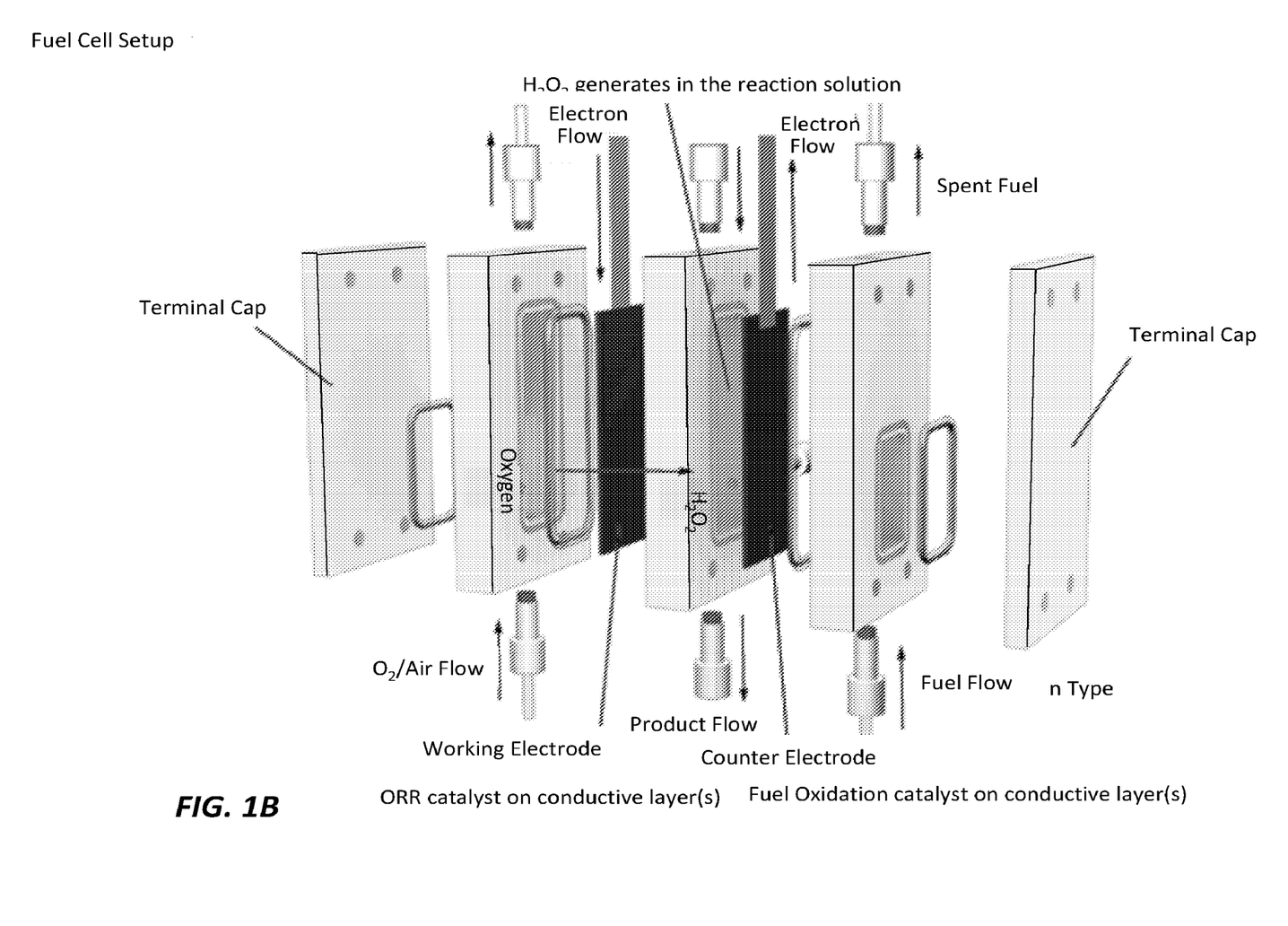
Figure 1C:
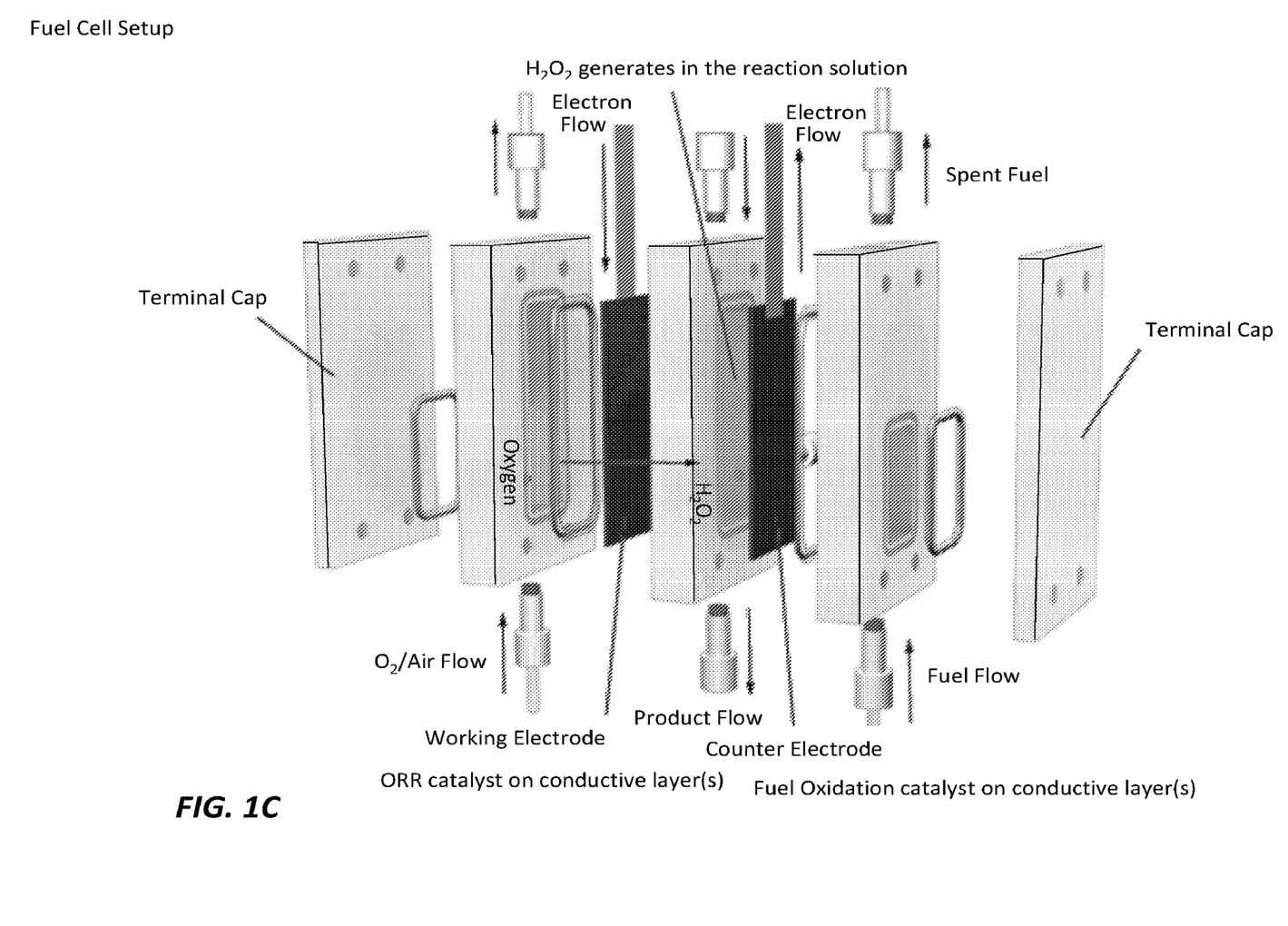

Taking these criteria into consideration, a membrane-free electrolyzer is provided that includes two carbon paper electrodes, the cathode coated with CMK-3 and the anode with an OER catalyst. Catalysts are drop-casted on graphite carbon paper, with the backside of the Gas diffusion layer (GDL) coated with a hydrophobic polymer, which will allow the diffusion of gas but prevent the water diffusion to a desired level. The polycarbonate cell is composed of three main chambers: the cathode (first chamber, working electrode), the product storage collection (collection chamber), and the anode (second chamber, counter electrode) compartments shown in FIG. 1A. The entire cell is filled with 0.1 M KOH electrolyte. FIG. 1B shows the membrane-free electrolyzer and fuel-cell configured for the electrolyzer mode, and FIG. 1C shows the membrane-free electrolyzer and fuel-cell configured for the fuel-cell mode, according to embodiments of the invention.

On the cathode, the oxygen flow comes into contact with the ORR catalyst coated on the side-facing the collection chamber, and gets reduced into $H_2O_2$. The product is dissolved into the electrolyte in the collection chamber. On the anode, the catalyst is coated on the side-facing the second chamber and drives the OER. The hydrophobic layer on the back of the carbon paper blocks the diffusion of $H_2O_2$, creating a unidirectional flow of $H_2O_2$ through the carbon paper. By orienting cathode carbon papers so that the backs are facing the collection chamber, product crossover to the anode is mitigated and a high concentration of $H_2O_2$ can be accumulated. In this embodiment, CMK-3 is used as the ORR catalyst, where carbon-based catalysts including but not limited to high surface area carbons and heteroatom doped carbon materials are also useful materials, while the OER candidates that are applicable for use: precious metal-based systems including but not limited to Pt and Ir, N-doped carbon[23], and metal oxides including but not limited $NiFeO_X$. The reactions carried out in this example were conducted as batch processes, but it is also possible to operate the device as a continuous electrolyte flow reactor.

TABLE 1

Testing results for electrolyzer mode with different OER catalysts.

|  | Electrolyzer 1 | Electrolyzer 2 | Electrolyzer 3 (120 min Stability) |
|---|---|---|---|
| Cathode | 0.0848 mg/cm² CMK-3 + Oxygen | 0.0848 mg/cm² CMK-3 + Oxygen | 0.0848 mg/cm² CMK-3 + Oxygen |
| Anode | 0.2544 mg/cm² Pt + $H_2O$ | 0.4240 mg/cm² N—C + $H_2O$ | 0.007 mg/cm² $Ni_{0.75}Fe_{0.25}O_x$ + $H_2O$ |
| Product/ Efficiency | 518 mg/L efficiency 100% | 425 mg/L efficiency 100% | 2795 mg/L |

Figure 2:
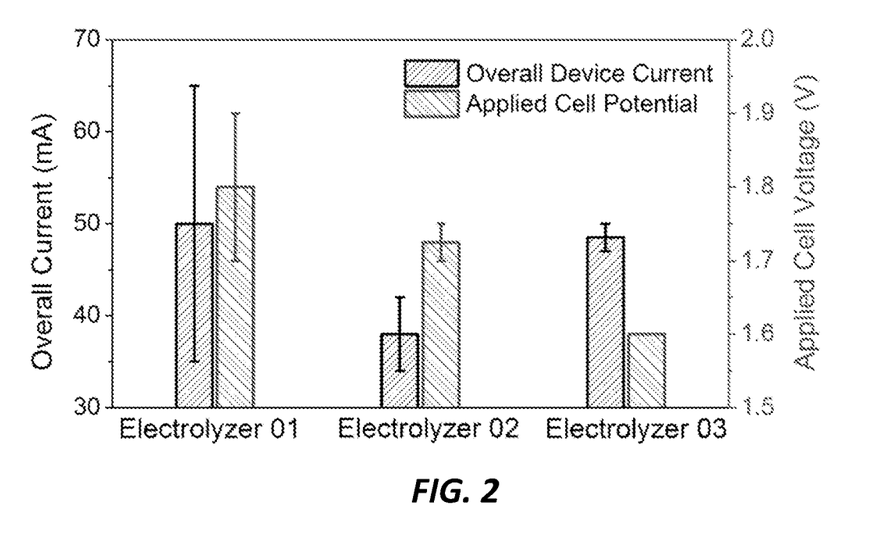
FIG. 2 shows a summary of testing conditions of three different electrolyzer configurations, according to different embodiments of the invention.

Table 1 and FIG. 2 summarize the testing conditions of the three different electrolyzer configurations. Since $H_2O_2$ readily self-decomposes in alkaline media without a stabilizer, the reaction was limited to under 20 minutes and the $H_2O_2$ concentration was measured immediately to accurately measure the Faradaic efficiency. The concentration of $H_2O_2$ product was determined by test paper (EMD Millipore Peroxide Test Strips) and an iodometric titration. During the 10-minute test, the concentration of $H_2O_2$ in electrolyzer 1 and 2 were 518 mg/L and 425 mg/L, respectively, indicating that the measured Faradaic efficiencies are 100%, within the error of the titration technique.

Figure 3:
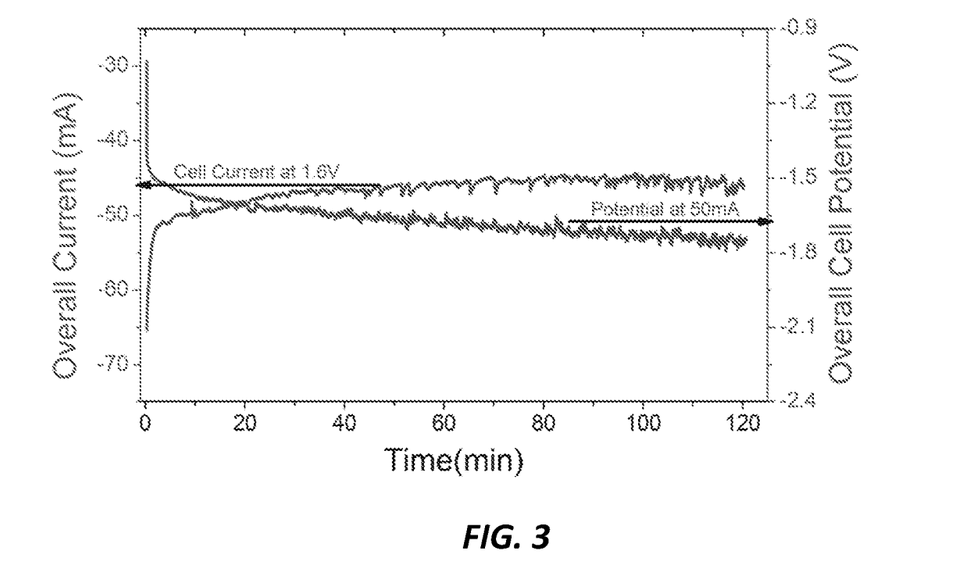
FIG. 3 shows a long-term stability test of one example electrolyzer over 2 hours without a chemical stabilizer, according to one embodiment of the invention.

For electrolyzer 3, the anode catalyst was changed to $NiFeO_X$ due to its superior activity and stability for the OER. FIG. 3 shows a long-term stability test of electrolyzer 3 over 2 hours without a stabilizer. Bubble formation was observed within 30 minutes, implying that $H_2O_2$ was self-decomposing into $O_2$ and $H_2O$, and led to a loss in Faradaic efficiency. Nevertheless, chronoamperometric testing shows only a 7% decrease in current over 2 hours, and the final concentration of $H_2O_2$ reaches a steady state between the self-decomposition and electrochemical generation at approximately 2800 mg/L. Overall, the electrolyzer cell can operate at ~46 mA overall current at pH 13 with an applied cell potential of 1.6 V. The overall cell potential could be further reduced by optimizing the loading of the $NiFeO_X$ OER catalyst. The efficiency before the self-decomposition of the $H_2O_2$ is over 90%, which agrees well with the high selectivity observed from RRDE studies.

Figure 4:
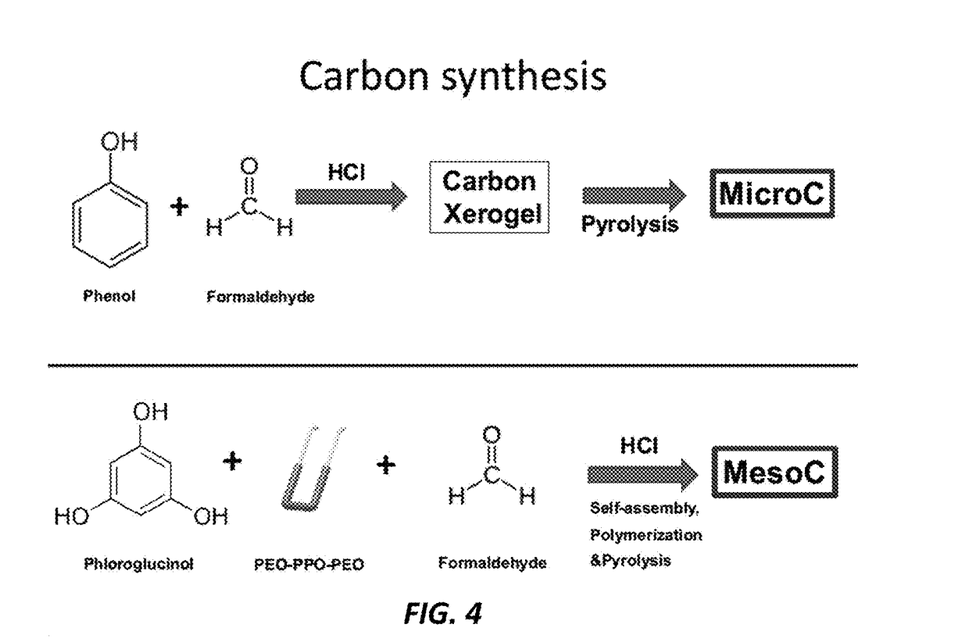
FIG. 4 shows carbon synthesis steps for forming the mesopore (mesoC) and micropore (micoC) carbon structures.

FIG. 4 shows the carbon synthesis steps for forming the mesopore (mesoC) and micropore (micoC) carbon structures.

An exemplary embodiment of a small-scale, low-cost electrochemical reactor is provided herein for the production of hydrogen peroxide ($H_2O_2$). In this device, an ordered mesoporous carbon, CMK-3 that exhibits >90% selectivity for the 2 e⁻ ORR in alkaline conditions, with excellent activity. At a pH of 13, the reactor demonstrated an overall current of ~50 mA at a stable uncompensated applied cell potential of ~1.6 V for over 2 hours. The high performance of the device can be attributed to the active and selective CMK-3 catalyst, and the durable membrane-free cell design. This cell design allows for flexibility in catalyst material selection, such that a wide range of catalysts for the oxygen evolution reaction (OER) or the hydrogen oxidation reaction (HOR) could be utilized for operation depending on the mode, electrolyzer or fuel cell, respectively. The cell design leads to low manufacturing cost, and the low total cell potential of 1.6 V is promising for device integration with a solar panel or portable rechargeable battery. The catalyst loading sheet is readily manufactured, and the module may operate with only air and the aqueous electrolyte as inputs. These advantages allow the device to be highly practical and readily scalable for use in de-centralized applications, e.g. in developing areas for clean drinking water. Further optimization using a continuous flow configuration and stabilizer additives is underway to prevent the self-decomposition of $H_2O_2$ and to increase the product concentration.

Figure 5:
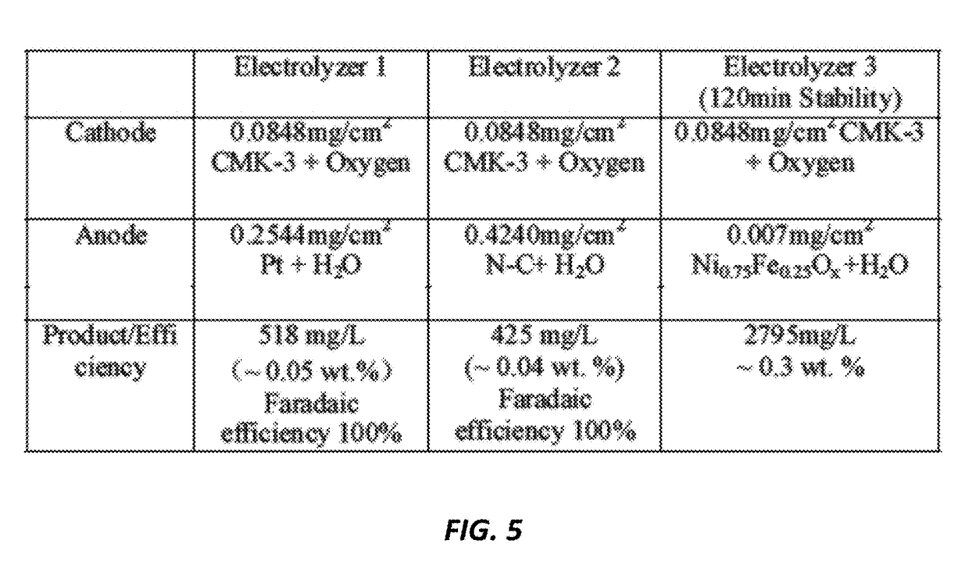
FIG. 5 shows a chart of different electrolyzer configurations of the cathode and anode materials, and the comparative efficiencies of each electrolyzer, according to different embodiments of the invention.

FIG. 5 shows a chart of different electrolyzer configurations of the cathode and anode materials, and the comparative efficiencies of each electrolyzer, according to different embodiments of the invention.

Electrochemical testing was carried out in a four-electrode setup utilizing a graphite rod counter electrode with a Ag/AgCl reference. If unspecified, the working electrode was prepared by mixing 1 mg of material, 98 μL of ethanol and 2 μL of cation-exchanged Nafion solution (Sigma-Aldrich™). 10 μL of the resulting catalyst ink was then drop-casted onto a glassy carbon (GC) disk working electrode (Sigradur G HTW Hochtemperatur-Werkstoffe GmbH™) to obtain a catalyst loading of 0.51 mg/cm².

RRDE measurements were carried out by sweeping the disk potential between 0.2 V and 1.1 V vs. RHE at 10 mV/s while holding the Pt ring at 1.2 V vs. RHE to oxidize hydrogen peroxide species formed on the disc electrode, allowing for ORR product quantification. The system's ring collection efficiency was determined to be 0.2545 using the reversible $[Fe(CN)_6]4^-/3^-$ redox couple (+0.36 vs. SHE). The selectivity of $H_2O_2$ can be calculated according to eq. (I):

$$H_2O_2(\%) = 200 \frac{I_R/N}{I_D + I_R/N} \tag{I}$$

Where $I_R$ is the ring current, $I_D$ is the disk current, and N is the collection efficiency (0.255). For the RDE measurements, the shaft was rotated at 1,600 rpm and the potential was cycled between 0.2 V and 1.1 V vs. RHE at 10 mV/s. The ORR activity was determined by subtracting the current obtained in an $N_2$-saturated electrolyte from that obtained in an $O_2$-saturated electrolyte. Also, multiple 10 mV/s runs were conducted at different rotation rates ranging from 400 to 2,500 rpm for Koutecky-Levich analysis. The potential scale was calibrated to the reversible hydrogen electrode (RHE) using a Pt wire (Sigma-Aldrich™) as the working electrode in a H$_2$-saturated electrolyte, and a value of 0.959 V was obtained.

Accelerated stability testing was performed by sweeping the potential between 0.2 and 1.1 V vs. RHE at a scan rate of 200 mV/s for 1,000 cycles. A regular 10 mV/s scan between 0.2 and 1.1 V vs. RHE was conducted after 100, 300, 500 and 1,000 cycles to ascertain the change in activity over time.

Device electrode fabrication catalysts are drop-casted on the Sigracet® Graphite carbon paper from Ion power Inc, with the backside of the Gas diffusion layer (GDL) coated with a hydrophobic polymer which will allow the diffusion of gas but prevent the water diffusion to a desired level. The carbon paper is cut into 2 cm by 6.5 cm slices and place on hotplate at 90 for better drying of the ink. CMK-3 ink was prepared by dissolving 7 mg of catalyst into 0.28 ml of H$_2$O and 1.12 ml Isopropyl alcohol (IPA) with 250 µl of Fumion FAA-3 (From Fumatech, anion exchange ionomer solution in NMP.) 260 µl of the ink is then cast over the carbon paper in front. The cast amount to achieve the loading in this paper is 260 µl for CMK-3, 780 µl for Pt and 1300 µl for N-doped Carbon. The NiFeO$_X$ water oxidation catalyst was electrodeposited on the carbon paper in a 3-electrode configuration in an aqueous solution of 95 mM Ni(N)O$_3$)$_2$·6H$_2$O (99.9985%, Strem Chemicals, Inc.) and 5 mM Fe(NO$_3$)$_3$·9H$_2$O (99.99%, Aldrich) using Ag/AgCl reference and carbon paper counter electrode. The chronoamperometric electrodeposition was carried out at −0.9 V vs. Ag/AgCl for 15 s with 85% compensation for electrolyte resistance.

The concentration of H$_2$O$_2$ was first determined through EMD Millipore MQuant™ Peroxide Test Strips 0.5 mg/L-25 mg/L and 100 mg/L-1000 mg/L. The sample solution was first neutralized with 1:1 volume of 0.1M HClO$_4$ and measured with the Test Strip to determine the range of the concentration. At the higher concentration range, the iodometric titration was used for the more accurate measurements. The sample was mixed with 50 mL of demineralized water, 10 mL of 3M sulfuric acid solution, 10-15 ml of 1% w/v potassium iodide solution, and two drops ammonium molybdate solution inside an Erlenmeyer flask. An ammonium molybdate solution was prepared by dissolving 9 grams of ammonium molybdate in 10 ml 6M NH$_4$OH, then adding 24 grams of NH$_4$NO$_3$ and then diluting to 100 mL. The sample was then titrated with 0.1 M sodium thiosulfate to faint yellow or straw color. The sample was swirled or stirred gently during titration to minimize iodine loss. After that, about 2 mL of starch indicator was added, and the titration continued until the blue color just disappeared, with a similar procedure repeated on the blank solution. The concentration is calculated by the following equations:

$$\text{Weight \% H}_2\text{O}_2=(A-B)\times(\text{Normality of Na}_2\text{S}_2\text{O}_3)\times 1.7/\text{Sample weight in grams Where:}$$

$$A=\text{ml Na}_2\text{S}_2\text{O}_3 \text{ for sample; } B=\text{ml Na}_2\text{S}_2\text{O}_3 \text{ for blank}$$

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example: by changing the number of compartments, the dimensions of the device, the product production rate and concentration, flow rates, direction of flow, types of catalyst used, methods of supporting the catalysts, types of electrodes, generation of H$_2$O$_2$ at the anode, etc. The product solution can also be used for multiple field of application, including but not limited to the paper and pulp industry, mobile water disinfection or medical usage, among others.

All such variations are considered to be within the scope and spirit of the present invention as defined by the following claims and their legal equivalents.

What is claimed:

1. A membrane-free electrochemical reactor, comprising:
    a) a collection chamber disposed between a cathode chamber and an anode chamber, wherein said cathode chamber and said anode chamber are sealably connected to said collection chamber;
    b) a mesoporous carbon paper cathode, and a mesoporous carbon paper anode, wherein said mesoporous carbon paper cathode is disposed between said cathode chamber and said collection chamber, wherein said mesoporous carbon paper anode is disposed between said anode chamber and said collection chamber, wherein said mesoporous carbon paper cathode is coated with an Oxygen Reduction Reaction (ORR) catalyst; wherein the ORR catalyst is positioned on a side of the mesoporous carbon paper cathode facing the collection chamber, wherein said ORR catalyst imparts a two-electron partial reduction reaction to hydrogen peroxide, wherein said mesoporous carbon paper anode is coated with an Oxygen Evolution Reaction (OER) coating; wherein the OER coating is positioned on a side of the mesoporous carbon paper anode facing the anode chamber;
    c) an oxygen input port, and an oxygen output port, wherein said oxygen input port is connected to said cathode chamber, wherein said oxygen output port is connected to said cathode chamber;
    d) a water input port, and a water output port, wherein said water input port is connected to said anode chamber, wherein said water output port is connected to said anode chamber, wherein said water input port and said water output port are in an open state;
    e) a second water input port connected to said collection chamber; and
    f) a hydrogen peroxide output port connected to said collection chamber.

2. The membrane-free electrochemical reactor of claim 1, wherein said Oxygen Evolution Reaction (OER) coating is stable during operation of said electrochemical reactor.

3. The membrane-free electrochemical reactor of claim 1, wherein said mesoporous carbon paper cathode is coated with a conductive layer comprising a high surface area catalyst support material.

4. The membrane-free electrochemical reactor of claim 3, wherein said mesoporous carbon paper cathode is coated with CMK-3.

* * * * *

UNITED STATES PATENT AND TRADEMARK OFFICE
CERTIFICATE OF CORRECTION

| | | |
|---|---|---|
| PATENT NO. | : 11,718,919 B2 | Page 1 of 1 |
| APPLICATION NO. | : 16/342656 | |
| DATED | : August 8, 2023 | |
| INVENTOR(S) | : Thomas Francisco Jaramillo | |

It is certified that error appears in the above-identified patent and that said Letters Patent is hereby corrected as shown below:

In the Specification

At Column 1, Line 11, insert the following:
--STATEMENT OF GOVERNMENT SPONSORED SUPPORT
This invention was made with Government support under contract DE-SC0008685 awarded by the Department of Energy. The Government has certain rights in the invention.--

Signed and Sealed this
Tenth Day of December, 2024

Katherine Kelly Vidal
*Director of the United States Patent and Trademark Office*